United States Patent
Saaroni et al.

(10) Patent No.: US 10,719,482 B2
(45) Date of Patent: Jul. 21, 2020

(54) DATA COMPARISON

(71) Applicant: HEWLETT PACKARD ENTERPRISE DEVELOPMENT LP, Houston, TX (US)

(72) Inventors: Dror Saaroni, Yehud (IL); Eran Bachar, Yehud (IL); Elad Malki, Yehud (IL); Roy Wallerstein, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 212 days.

(21) Appl. No.: 15/504,006

(22) PCT Filed: Jan. 12, 2015

(86) PCT No.: PCT/US2015/010972
§ 371 (c)(1),
(2) Date: Feb. 14, 2017

(87) PCT Pub. No.: WO2016/114748
PCT Pub. Date: Jul. 21, 2016

(65) Prior Publication Data
US 2017/0277710 A1    Sep. 28, 2017

(51) Int. Cl.
*G06F 7/00*      (2006.01)
*G06F 16/17*    (2019.01)
(Continued)

(52) U.S. Cl.
CPC ...... *G06F 16/1734* (2019.01); *G06F 11/3672* (2013.01); *G06F 16/25* (2019.01); *G06F 16/00* (2019.01)

(58) Field of Classification Search
CPC ......... G06F 17/30144; G06F 17/30557; G06F 11/3672; G06F 17/30; G06F 8/00; G06F 9/44589; G06F 11/36; G06F 11/368
(Continued)

(56) References Cited

U.S. PATENT DOCUMENTS 5,335,342 A * 8/1994 Pope .................... G06F 11/3672
                                                        714/38.13
5,600,789 A * 2/1997 Parker ................. G06F 11/3688
                                                        714/38.11
(Continued)

FOREIGN PATENT DOCUMENTS

CN          1684034 A      10/2005
CN        101194233 A       6/2008
(Continued)

OTHER PUBLICATIONS

AppPerfect Corporation, "GUI Testing," (Web Page), copyright 2003-2013, retrieved online on Oct. 23, 2014, 7 pages, available at http://www.appperfect.com/products/application-testing/app-test-gui-testing.html.
(Continued)

*Primary Examiner* — Mohammed R Uddin

(57) ABSTRACT

In one implementation, a test data comparison system can include a history engine to gather test data and maintain a log of test data based on element identifiers of a user interface, a comparison engine to identify a degree of diversity from a comparison of a first data and a second data and determine a second data entered at a first location is diverse from a first data entered at the first location when the degree of diversity achieves a diversity level of a diversity rule, and a suggestion engine to cause a message to be generated based on the comparison.

20 Claims, 4 Drawing Sheets

(51) Int. Cl.
*G06F 16/25* (2019.01)
*G06F 11/36* (2006.01)
*G06F 16/00* (2019.01)

(58) Field of Classification Search
USPC ........................................ 707/625, 690, 694
See application file for complete search history.

(56) References Cited

U.S. PATENT DOCUMENTS

| | | | | |
|---|---|---|---|---|
| 5,758,062 | A * | 5/1998 | McMahon | G06F 11/3688 714/33 |
| 6,061,643 | A * | 5/2000 | Walker | G06F 11/3688 702/123 |
| 6,272,506 | B1 | 8/2001 | Bell | |
| 6,460,147 | B1 * | 10/2002 | Cox | G06F 11/3684 703/22 |
| 6,823,478 | B1 * | 11/2004 | Prologo | G06F 11/368 714/38.14 |
| 8,024,453 | B2 * | 9/2011 | Ahmed | G06F 11/3414 709/223 |
| 8,185,877 | B1 * | 5/2012 | Colcord | G06F 9/44 717/124 |
| 8,539,282 | B1 * | 9/2013 | Kabanov | G06F 11/3688 702/182 |
| 8,549,483 | B1 * | 10/2013 | Bridges, Sr. | G06F 11/3684 717/126 |
| 8,788,885 | B1 * | 7/2014 | Cook | G06F 11/3664 714/38.1 |
| 9,009,013 | B2 * | 4/2015 | Krainz | G05B 17/02 703/13 |
| 9,213,625 | B1 * | 12/2015 | Schrage | G06F 11/3688 |
| 9,501,390 | B1 * | 11/2016 | Chellappa | G06F 11/3692 |
| 9,547,638 | B2 * | 1/2017 | Studer | G06F 8/00 |
| 10,127,148 | B2 * | 11/2018 | Ellis | G06F 11/3684 |
| 2005/0081104 | A1 | 4/2005 | Nikolik | |
| 2005/0166094 | A1 * | 7/2005 | Blackwell | G06F 11/3664 714/38.14 |
| 2006/0085132 | A1 * | 4/2006 | Sharma | G06F 11/3688 702/1 |
| 2006/0212540 | A1 * | 9/2006 | Chon | G06F 11/261 709/218 |
| 2006/0253742 | A1 * | 11/2006 | Elenburg | G06F 11/3414 714/38.14 |
| 2008/0086499 | A1 | 4/2008 | Wefers et al. | |
| 2008/0148235 | A1 * | 6/2008 | Foresti | G06F 11/3604 717/123 |
| 2008/0282231 | A1 * | 11/2008 | R | G06F 11/3684 717/127 |
| 2009/0055331 | A1 * | 2/2009 | Stewart | G06F 11/3692 706/11 |
| 2010/0114939 | A1 * | 5/2010 | Schulman | G06F 11/3672 707/769 |
| 2011/0265175 | A1 | 10/2011 | Bhat | |
| 2011/0289489 | A1 * | 11/2011 | Kumar | G06F 11/3664 717/135 |
| 2012/0253728 | A1 * | 10/2012 | Chamas | G06F 11/2294 702/109 |
| 2013/0024842 | A1 * | 1/2013 | Browne | G06F 11/3676 717/125 |
| 2013/0117609 | A1 * | 5/2013 | Dande | G06F 11/3692 714/32 |
| 2013/0159784 | A1 | 6/2013 | Rossi | |
| 2013/0185594 | A1 * | 7/2013 | Budnik | G06F 11/3668 714/38.1 |
| 2013/0263089 | A1 * | 10/2013 | Banerjee | G06F 11/3684 717/124 |
| 2013/0338995 | A1 * | 12/2013 | Elkins | G06F 17/28 704/2 |
| 2014/0052758 | A1 * | 2/2014 | Callery | G06Q 10/0631 707/776 |
| 2014/0237451 | A1 | 8/2014 | Koneru et al. | |
| 2015/0286556 | A1 * | 10/2015 | Ellis | G06F 11/3684 717/125 |
| 2015/0339213 | A1 * | 11/2015 | Lee | G06F 11/3664 717/125 |
| 2016/0132415 | A1 * | 5/2016 | Dillard | G06F 11/263 714/33 |

FOREIGN PATENT DOCUMENTS

| | | |
|---|---|---|
| CN | 103793326 A | 5/2014 |
| CN | 103810085 A | 5/2014 |
| CN | 104111885 A | 10/2014 |
| JP | 2011048441 A | 3/2011 |
| WO | WO-2014026961 A1 | 2/2014 |

OTHER PUBLICATIONS

International Search Report & Written Opinion received in PCT Application No. PCT/US2015/010972, dated Jun. 30, 2015, 8 pages.

Chinese Office Action, CN Application No. 201580072453.8, dated Mar. 1, 2020 (with machine English translation).

* cited by examiner

DATA COMPARISON

BACKGROUND

Software developers commonly designate a stage of the software development cycle to testing the software under development. Software testing becomes more complex with respect to the increase in complexity of software. For example, testing software has been developed to run repeatable tests on software using scripts to verify quality of the product quickly to meet agile-based deadlines. Manual testing using manual user interaction to test the elements of the software continues to be relevant for exploratory testing, such as testing end-to-end use cases.

DETAILED DESCRIPTION

In the following description and figures, some example implementations of test data comparison apparatus, systems, and/or methods of data diversity identification are described. A strength of manual testing is to find functionality or use-cases that are not part of automated testing. For another example purpose of manual testing, a manual tester can verify a use case or test scenario. Although the work of a manual tester may be repetitive, the manual tester should challenge the application under test in a variety of ways to provide different verification and ensure the quality coverage of the test is robust.

Various examples described below relate to providing a manual tester an alert when the test data entered by the manual tester is not diverse enough. Using data diversity rules, the test actions of the manual tester can be compared to actions that have been previously performed to identify whether the test actions are diverse enough (e.g., different enough) that the test actions will increase the overall quality coverage of the application under test. If a comparison of the test data determines the test action is too similar to previously tested actions, then an alert can be presented to the user so that the test action can be exchanged for an action with more diversity.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, manage, and/or modify."

Figure 1:
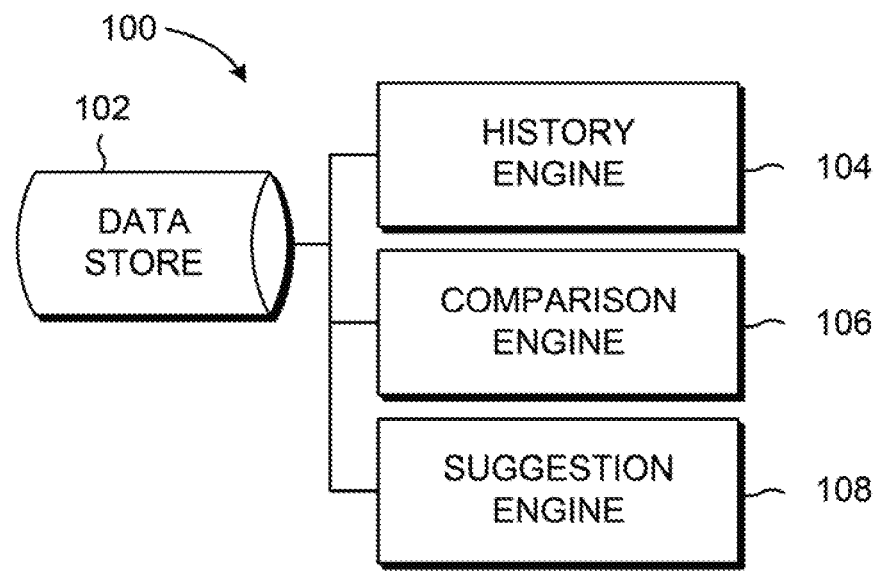
FIGS. 1 and 2 are block diagrams depicting example test data comparison systems consistent with disclosed examples.
Figure 2:
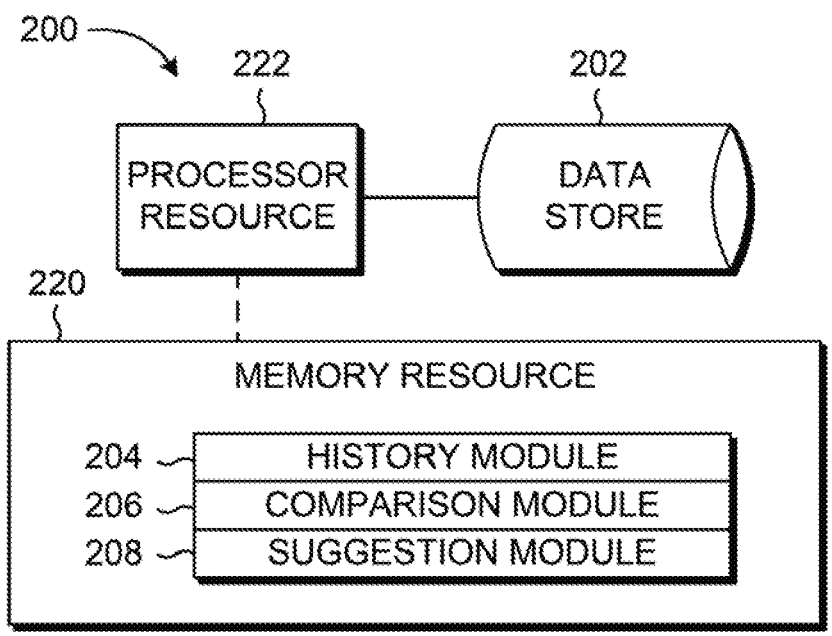

FIGS. 1 and 2 are block diagrams depicting example test data comparison systems 100 and 200 consistent with disclosed examples. Referring to FIG. 1, the example test data comparison system 100 of FIG. 1 generally includes a data store 102, a history engine 104, a comparison engine 106, and a suggestion engine 108. In general, the suggestion engine 108 can provide a message based on a comparison, via the comparison engine 106, of test data to historical data maintained by the history engine 104.

The history engine 104 represents any circuitry or combination of circuitry and executable instructions to gather test data on a user interface and maintain a log of test data. For example, the history engine 104 can be a combination of circuitry and executable instructions to maintain a data store 102 that tracks the history of data entered at a location and stores the historical test data in a log. The test data can include location data associated with where the test data is used on the user interface, such as manual test data entered at a location determined by a manual tester. The history engine 104 maintains the log based on element identifiers of a user interface on which the manual test data was used. For example, the log can include an entry for a click on a button and another entry when "John" is entered into a first-name text field box, where the entry for the click is represented by the element identifier associated with the button and the entry for "John" is represented by the element identifier associated with the text field box. For another example, the log can include an entry for each item of a drop down menu that has been selected during a test where each entry is identified with a string "ddmenu001" to designate each entry as associated with the first drop down menu. The log of manual test data can include a first data used at a first location and the first location can be a location of a user interface element or otherwise associated with (e.g., assigned to) an element identifier.

An element identifier represents any portion of the user interface. For example, portions of the user interface can include a user interface element, such as a window, a label, a text box, a selection box, a drop down menu, a grid, or a button. For another example, the element identifier can represent a point on the user interface, an area of the user interface, a path of the user interface, or a presentation resource used to generate the user interface. An element identifier can be any appropriate representation capable of identification, such as a number, a character, a string, a color, a symbol, a label, or other value.

The history engine 104 can gather information and compile the information in a useful organization to allow for the comparison engine 106 to compare future test data, such as data entries. For example, the history engine 104 can identify test actions that are related and aggregate a plurality of data entered at the location associated with the related test action. For another example, the history engine 104 can correlate a plurality of events on a user interface ("UI") to a first element identifier based on the location of the events. Historical test data can be from multiple sources. For example, the history engine 104 can conglomerate a plurality of data entered at the first location from a plurality of sources by tracking data entered on the UI from a plurality of sources and associate the history of data entered at the first location with a UI element. Example sources include such multiple users, multiple data centers, and automated test systems. Each of the plurality of sources can provide events or representative data associated with element identifiers where each element identifier represents a UI element at a particular location of the UI.

The comparison engine 106 represents any circuitry or combination of circuitry and executable instructions to determine whether a second data entered at the first location is diverse from the first data entered at the first location based on a diversity rule and a comparison of the first data and the second data. For example, the comparison engine 106 can represent circuitry or a combination of circuitry and executable instructions to identify when data is manually entered at a first location during a test session, identify a degree of diversity between the manually entered data and previously entered data (i.e., historical data), and determine the manually entered data is diverse from the previously entered data when the degree of diversity achieves a diversity level of a diversity rule. The amount of data, class of data, and the level of diversity may vary based on the diversity rule. For example, if a test is being performed on an email text box, a diversity rule regarding testing different domains would identify that [johndoe@anexampledomain.com] would be similar to [janesmith@anexampledomain.com] because the condition of the diversity rule would be to check the string related to the domain after the "@" symbol. In that example, the suggestion engine 108, discussed below, would cause a message to encourage the user to try a different domain such as [asecondexampledomain.com] or [anexampledomain.net]. The condition of the diversity rule defines requirements for data to be diverse. For example, the condition can define the level of diversity between manually entered data and previously entered data to satisfy the condition of the diversity rule and perform an action (e.g., generate a message) based on satisfaction of the condition. For example, a certain number of characters may be required to be similar to satisfy a condition. For another example, a right-click can be set to satisfy a condition of diversity from a left-click.

The comparison engine 106 can make the diversity determination based on a characteristic of the test data. In the previous example, the characteristic can be identified as the "@" symbol denoting an email address. For another example, a characteristic can be text with a recognizable pattern (such as a regular expression) or informational conformity, such as an address should start with a number or whether a test action should include a text field entry with a particular string length. The characteristic can be any character, symbol, value, pattern, or categorization that can be distinguished among data. The diversity rule can be selected based on an informational classification of the identified characteristic. For example, the type of information being entered can be classified based on a semantic meaning and/or use of the entered data and the diversity rule can be selected from a database of diversity rules when the diversity rule is associated with the class of the type of information associated with the semantic meaning and/or use. For example, a three-letter airport code of a city can be set to satisfy a condition of lack of diversity from the written name of the city because the written name and the airport code represent the same meaning. Example diversity rules include a data length rule to compare a first length of the set of data to a second length of the history of data, a data type rule to compare a first data type of the set of data to a second data type of the history of data, a language rule to compare a first language of the set of data to a second language of the history of data, a security rule to compare the set of data against potential security problems, a password rule to identify a strength of password field data when the UI element is a password field, an illegal character rule to compare a first character of the set of data to a second character of the history of data, an administrative rule to compare the set of data to a business-specific definition, and a time rule to compare the set of data against a time scope.

The comparison engine 106 can identify a characteristic of test data, select a diversity rule based on the identified characteristic, identify a relationship between the test data and historical data, and determine whether the comparison achieves a diversity threshold (i.e., a target level of diversity between compared data sets) based on the relationship. The relationship can be identified based on an analysis of the identified characteristic on the test data and on the historical data. A data characteristic relationship can be any analysis on how the characteristic of a first data set is different from a second data set. Example relationships include a representation that the compared data are exactly the same (i.e., no difference), a representation that the compared data vary in a way that does not improve diversity (i.e., the texts "aa" and "bb" are different but it would not improve the robustness of the test to try both strings), and a representation that the compared data are not related (i.e., a difference exists in the identified characteristic). The relationship can represent a degree of diversity between the identified characteristic as observed in each data set. For example, the relationship can describe the difference in the characteristic and, based on the diversity rule, whether the difference is subtle or substantial. In this manner, the relationship and the diversity threshold level can be compared. For example, the diversity threshold level can be a condition of the diversity rule, and the condition is satisfied when the relationship meets (or exceeds) the diversity threshold level.

The suggestion engine 108 represents any circuitry or combination of circuitry and executable instructions to cause a message to be generated (and presented) based on the comparison of the test data to historical data. For example, an alert regarding a particular characteristic can be generated when the condition of the associated diversity rule is satisfied. The message can include any appropriate set of characters and/or images to encourage diversity in the test data to be used on the application under test. For example, the message can range from a general request to diversify the test data or provide a specific example of what data should be entered. The message can include the particular characteristic or diversity rule that is suggested to be changed. For example, when an item of a multi-selection element (such as a drop down menu or a group of elements such as a set of radio buttons) is selected again for testing, the suggestion engine 108 can generate a message such as "That item has been previously tested. Please select a different item."

In the case where an example can be provided, a predetermined example can be included in the message or an example can be generated by the suggestion engine 108. The suggestion engine 108 can select an example template based on the diversity rule and generate a diverse data example from the example template based on at least one of the currently entered data and the previously entered data. The example template represents a string with variables to replace characters based on historical data or potentially-entered data.

For another example of a message that can assist a manual tester, the suggestion engine 108 can select a subset of the log of manual test data to display. The subset can be selected based on at least one of a time scope and a degree of similarity of the test data to the subset. For example, the most recently entered data that satisfies a diversity rule can be displayed or the closest historical data (e.g., the data from the log that most closes matches the test data) can be displayed.

The suggestion engine 108 can cause a visual indication of data entered at the first location. For example, a degree of testing or a log of data tested at the first location can be indicated when hovering over the UI element. The visual indication can be based on a set of criteria including a time scope and a diversity category of a characteristic of the diversity rule. For example, a heat map can be overlaid on the UI to indicate areas that have been tested with less diversity with comparison to other areas of the UI. For another example, hovering over a UI element can show the diversity category and/or degree of diversity of the associated UI element.

The data store 102 can contain information utilized by the engines 104, 106, and 108. For example, the data store 102 can store a log of manual test data, an element identifier, a diversity rule, a suggestion message template, etc. A suggestion message template represents a set of data useable by the suggestion engine 108 to produce a message regarding the diversity of the data. For example, the suggestion message template can comprise text and a section to insert the log of manual test data and an example (e.g., using the example template discussed above) of how to diversify the test data where the text can provide a statement regarding the diversity of the data.

FIG. 2 depicts an example test data comparison system 200. System 200 comprises a memory resource 220 operatively coupled to a processor resource 222. The processor resource 222 can be operatively coupled to a data store 202. In some examples, the data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a history module 204, a comparison module 206, and a suggestion module 208. The history module 204, the comparison module 206, and the suggestion module 208 represent program instructions that when executed function in the same manner as the history engine 104, the comparison engine 106, and the suggestion engine 108 of FIG. 1, respectively. The processor resource 222 can carry out the modules 204, 206, 208, and/or any other appropriate operations among and/or associated with the modules of the system 200. For example, the processor resource 222 can carry out the modules to identify a characteristic of a set of data used to test a UI element at a first location of the UI, select a diversity rule from a plurality of diversity rules based on the characteristic of the set of data, compare the set of data to a condition of the diversity rule based on a history of data entered at the first location, and generate a message to be presented to a user when the set of data satisfies a diversity level of the condition of the selected diversity rule. For another example, the processor resource 222 can carry out the modules to track the history of data entered at the first location from a plurality of data sources, associate the history of data entered with a UI element based on a plurality of events associated with an identifier of the UI element, and store the history of data in a data store 202 coupled to the processor resource 222. For yet another example, the processor resource 222 can carry out the modules to recognize text of a set of test data being entered at a text field UI element, identify a subset of the history of data based on similarity of the subset of the history of data to the entered text, cause a message to include the subset of the history of data and an example of diverse data based on the diversity rule (where the message is displayed on the UI at the first location), and cause an indication of a degree of diversity of the set of data in comparison to the history of data entered at the first location.

Figure 4:
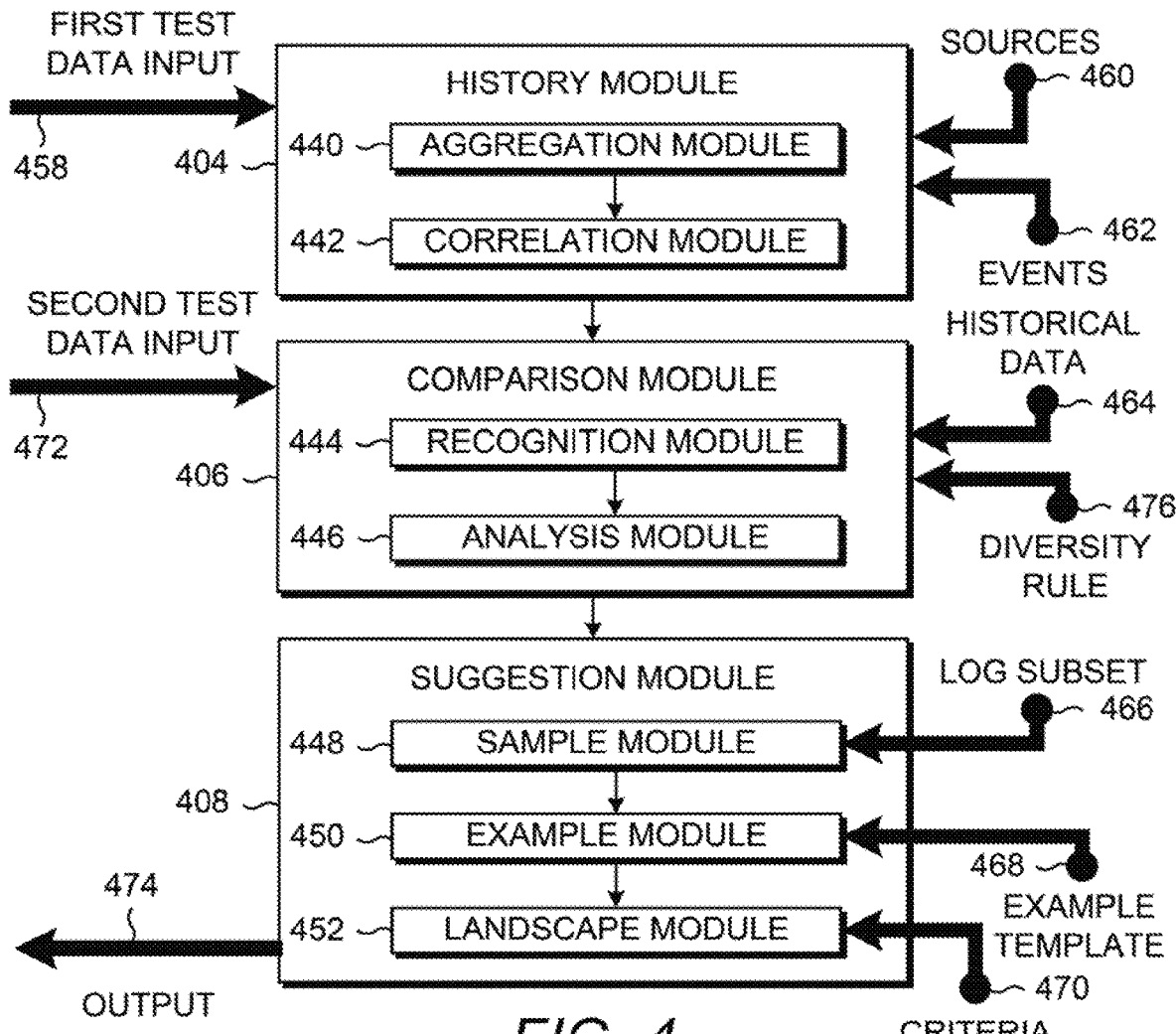
FIG. 4 depicts example modules consistent with disclosed example test data comparison systems.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined into a module that performs the functionalities discussed in relation to the two modules. As another example, functionalities performed at one module as discussed in relation to these examples can be performed at a different module or different modules. FIG. 4 depicts yet another example of how functionality can be organized into modules.

The processor resource 222 can be any appropriate circuitry capable of processing (e.g., computing) instructions, such as one or multiple processing elements capable of retrieving instructions from the memory resource 220, and executing those instructions. For example, the processor resource 222 can be at least one central processing unit ("CPU") that enables data diversity identification by fetching, decoding, and executing modules 204, 206, and 208. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 and/or the data store 202 can be distributed across devices. The memory resource 220 and the data store 202 can represent the same physical medium or separate physical mediums. The data of the data store 202 can include representations of data and/or information mentioned herein.

In the discussion herein, the engines 104, 106, and 108 of FIG. 1 and the modules 204, 206, and 208 of FIG. 2 have been described as circuitry or a combination of circuitry and executable instructions. Such components can be implemented in a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the executable instructions can be part of an installation package that when installed can be executed by the processor resource 222 to implement the system 200. In such examples, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
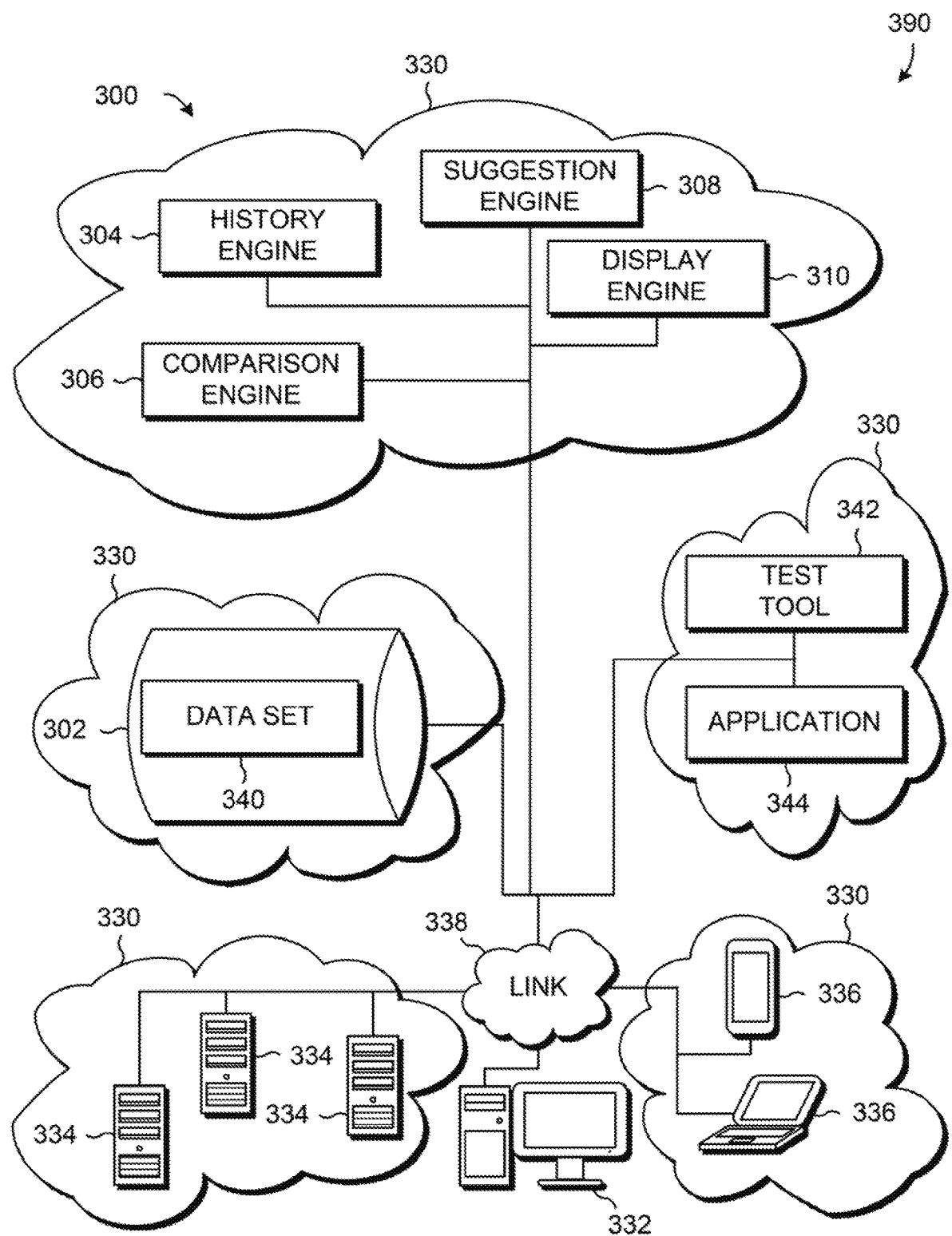
FIG. 3 depicts an example environment in which various test data comparison systems can be implemented consistent with disclosed examples.

FIG. 3 depicts an example environment 390 in which various example test data comparison systems 300 can be implemented consistent with disclosed examples. The example environment 390 is shown to include an example system 300 for identifying diversity of test data. The system 300 (described herein with respect to FIGS. 1 and 2) can represent generally any circuitry or combination of circuitry and executable instructions to identify test data diversity. The system 300 can include a history engine 304, a comparison engine 306, and a suggestion engine 308 that are the same as the history engine 104, the comparison engine 106, and the suggestion engine 108 of FIG. 1, respectively, and the associated descriptions are not repeated for brevity. The system 300 can also include a display engine 310. The display engine 310 represents circuitry or a combination of circuitry and executable instructions to prepare a suggestion message to be transmitted to a presentation mechanism, such as via an API. For example, the display engine 310 can prepare the message in a XML format or other web format. As shown in FIG. 3, the engines 304, 306, 308, and 310 can be integrated into a compute device, such as a service device 334. The engines 304, 306, 308, and 310 can be integrated via circuitry or as installed instructions into a memory resource of the compute device.

The example environment 390 can include compute devices, such as administrator devices 332, service devices 334, and user devices 336. A first set of instructions can be executed to perform functions of an application 344 via an administrator device 332. For example, an application 344 can be developed and modified on an administrator device 332 and stored onto a web server, such as a service device 334. The data set 340 can include data representing the performed functions and can be stored on data store 302. The service devices 334 represent generally any compute devices to respond to a network request received from a user device 336, whether virtual or real. For example, the service device 334 can operate a combination of circuitry and executable instructions to provide a network packet in response to a request for a page or functionality of an application. The user devices 336 represent generally any compute devices to communicate a network request and receive and/or process the corresponding responses. For example, a browser application may be installed on the user device 336 to receive the network packet from the service device 334 and utilize the payload of the packet to display an element of a page via the browser application.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, and 108 of FIG. 1 and/or the modules 204, 206, and 208 of FIG. 2 can be distributed across devices 332, 334, 336, or a combination thereof. The engine and/or modules can complete or assist completion of operations performed in describing another engine and/or module. For example, the suggestion engine 308 of FIG. 3 can request, complete, or perform the methods or operations described with the suggestion engine 108 of FIG. 1 as well as the history engine 104 and the comparison engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some examples, the engines of the system 300 can perform example methods described in connection with FIGS. 4-6.

FIG. 4 depicts example modules consistent with disclosed example test data comparison systems. Referring to FIG. 4, the example modules of FIG. 4 generally include a history module 404, a comparison module 406, and a suggestion module 408. The example modules of FIG. 4 can be implemented on a compute device, such as a service device 334 of FIG. 3.

Test data input 458 (e.g., previously entered historical test data) can be received by a processor resource executing the history module 404. The history module 404 represents program instructions that are similar to the history module 204 of FIG. 2. The history module 404 can include program instructions, such as an aggregation module 440 and a correlation module 442, to facilitate maintenance of a log of manual test data. The aggregation module 440 can represent program instructions that when executed by a processor resource cause the processor resource to conglomerate a plurality of data entered at the first location from a plurality of sources 460. The correlation module 442 can represent program instructions that when executed by a processor resource cause the processor resource to correlate a plurality of events 462 to a first element identifier associated with a first UI element located at a first location of the UI.

Test data input 472 (e.g., newly entered test data) can be received by a processor resource executing the comparison module 406. The comparison module 406 represents program instructions that are similar to the comparison module 206 of FIG. 2. The comparison engine 406 can include program instructions, such as a recognition module 444 and an analysis module 446, to facilitate determination of whether test data input 472 is diverse from historical test data input 464. The recognition module 444 represents program instructions that when executed by a processor resource cause the processor resource to identify a characteristic of the test data input 458. The analysis module 446 represents program instruction that when executed by a processor resource cause the processor resource to select the diversity rule 476 based on the characteristic identified by the processor resource executing the recognition module 444, identify a relationship between the test data input 472 and the second data input based on an analysis of the identified characteristic on both the test data input 472 and the historical data 464, and determine whether the comparison achieves a diversity threshold set by the diversity rule 476. The processor resource executing the comparison module 406 can provide the result of the diversity rule 476 to a processor executing the suggestion module 408.

The suggestion module 408 represents program instructions that are similar to the suggestion module 208 of FIG. 2. The suggestion module 408 can include program instructions, such as a sample module 448, an example module 450, and a landscape module 452, to facilitate generation of a message associated with the diversity rule 476. The sample module 448 represents program instructions that when executed by a processor resource cause the processor resource to select a subset of the log of manual test data (e.g., the historical data 464) to display based on at least one of a time scope and a degree of similarity of the test data input 472 to the subset 466. The example module 448 represents program instructions that when executed by a processor resource cause the processor resource to select an example template 468 based on the diversity rule 476 and generate a diverse data example from the example template based on at least one of the test data input 472 and the log subset 466. The landscape module 452 represents program instructions that when executed by a processor resource cause the processor resource to cause a visual indication of data entered at the first location based on a set of criteria 470. The set of criteria 470 can include a time scope, a diversity level, and/or a diversity category of a characteristic of the diversity rule 476. The processor resource executing the suggestion module 408 can generate output 474 that can include a suggestion message (including the example and log subset 466) and the visual indication.

Figure 5:
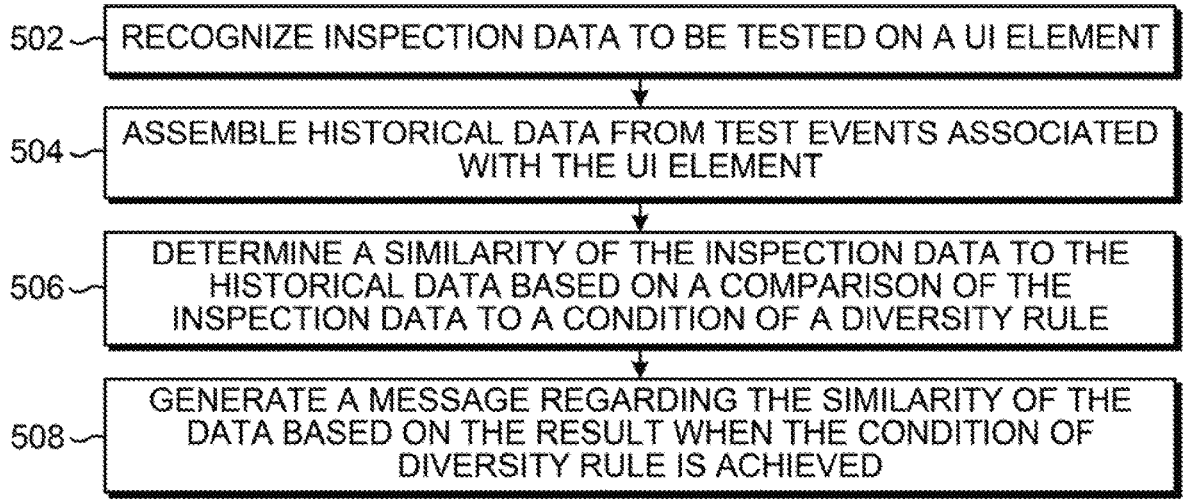
FIGS. 5 and 6 are flow diagrams depicting example methods of data diversity identification consistent with disclosed examples.
Figure 6:
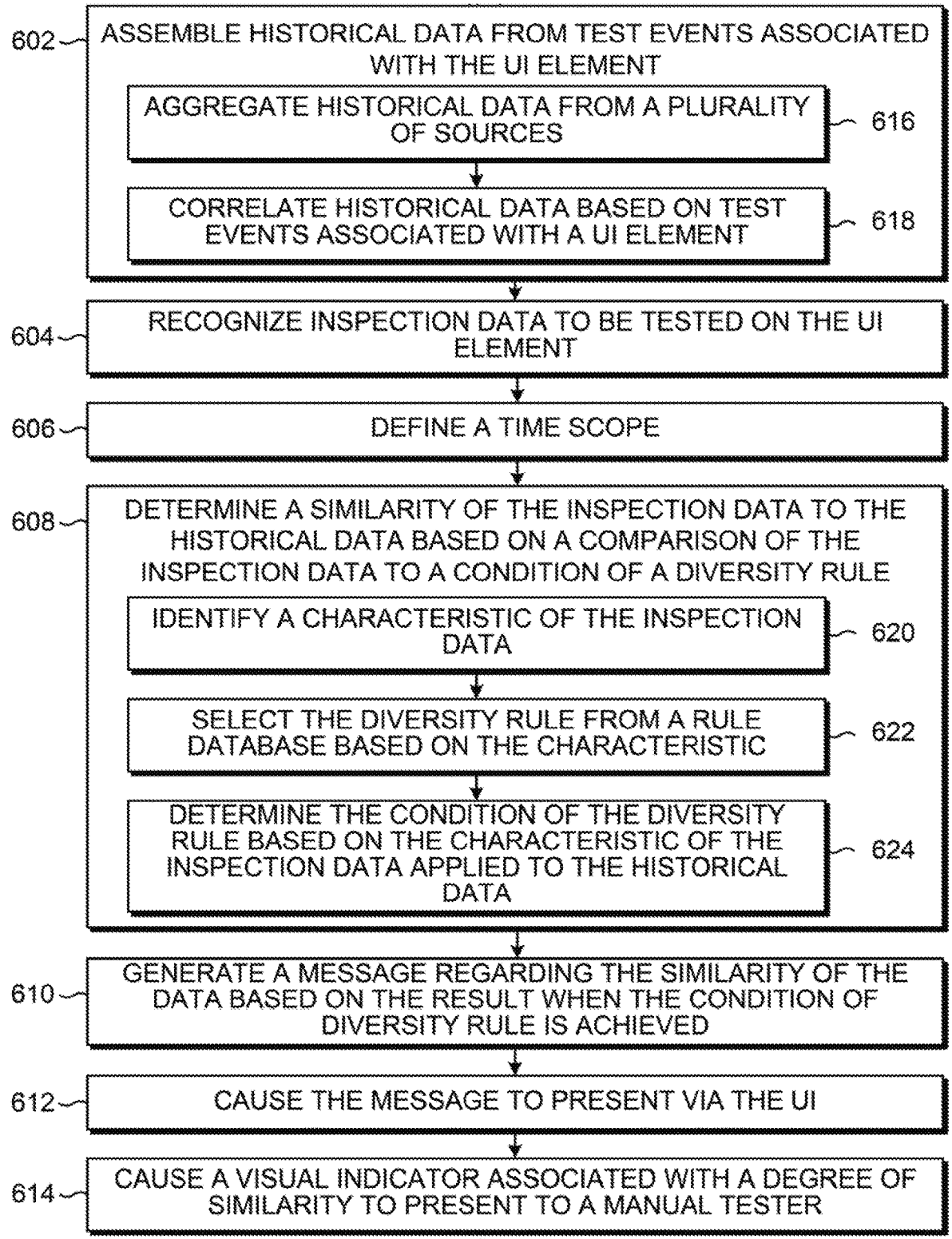

FIGS. 5 and 6 are flow diagrams depicting example methods of data diversity identification consistent with disclosed examples. Referring to FIG. 5, example methods of data diversity identification can generally comprise recognizing inspection data, assembling historical data from test events associated with a UI element, determining a similarity of the inspection data to the historical data based on a diversity rule, and generating a message regarding the similarity of the data.

Inspection data can be received as data to apply on an element of the UI. For example, inspection data can include text entered into a text box, a location data associated with a click on a button, data associated with a gesture across a window, a selection of an item in a list, selecting a radio button, interacting with a grid, etc. The inspection data can be provided by a manual tester using a test tool to perform a session of test actions on an application under test.

At block 502, inspection data is recognized. For example, the test data comparison system can recognize when data is being entered into a text field of an application under test during a test session. The inspection data can include data that is to be tested on a UI element of the UI, such as data being entered (e.g., and not completed or submitted) or submitted test data. For example, the recognition of the inspection data can occur prior to completing a form of the UI where the form includes a text field, and the inspection data comprises potentially-entered text data of the text field (such as autocomplete appendages to entered data). The source of the inspection data can be a manual tester performing exploratory testing.

At block 504, historical data is assemble from test events associated with the UI element. For example, historical data can be retrieved from a data store by querying the data store for events associated with a particular UI element identifier within a particular time scope. For another example, historical data can be gathered from a log of test data or captured during a test session of an application under test.

At block 506, a similarity between the inspection data and historical data is determined. For example, a similarity between the inspection data and historical data can be identified based on a comparison of the inspection data to a condition of a diversity rule where the condition of the diversity rule relies on the historical data of tests performed on the UI element. The historical data can be stored in a data store and the diversity rule can be a data structure including a condition and a result where the result is an action to be performed based on satisfaction of the condition.

At block 508, a message is generated regarding the similarity of the inspection data and the historical data. The message can be generated based on the result of the diversity rule when the condition of the diversity rule is achieved.

FIG. 6 includes blocks similar to blocks of FIG. 5 and provides additional blocks and details. In particular, FIG. 6 depicts additional blocks and details generally regarding gathering historical data, determining a diversity rule, causing the message to present. Blocks 602, 604, 608, and 610 are similar to blocks 502, 504, 506, and 508 of FIG. 5 and, for brevity, their respective descriptions are not been repeated.

At block 602, assembly of the historical data can include gathering, compiling, and organizing test events for comparison against future test data as exemplified by blocks 616 and 618 of FIG. 6. At block 616, historical data is aggregated from a plurality of sources. For example, the historical data can be gathered and compiled from multiple manual testers and/or automated tests using scripts. At block 618, events associated with a UI element are correlated from the aggregated historical data. In this manner, a data store containing the log can be organized by UI element identifier.

At block 606, a time scope is defined. The time scope can include any period of time of recorded data that has been entered into the log of manual test data. The time scope can be defined to determine the scope of historical data to be compared to the inspection data. For example, the time scope can be limited to the data from the previous week. The time scope can be used to determine a similarity of historical data to the inspection data by limiting the determination against historical data within the time scope.

At block 608, the determination of the similarity of inspection data and historical data is performed. At block 620, a characteristic of the inspection data is identified. For example, the characteristic can be at least one of a textual characteristic and a semantic characteristic. The characteristic can be an informational data type of the inspection data. For example, a determination as to the type of information to be entered at a text block can be identified and used to identify a diversity rule associated with that type of information, such as ensuring a phone number includes at least seven digits and only numbers. At block 622, a diversity rule is selected from a rule database of a data store based on the identified characteristic. At block 624, a determination as to whether the condition of the diversity rule is achieved. For example, the condition of the rule can be determined based on a comparison of how the characteristic of inspection data is applied to the historical data.

At block 612, the message generated at block 610 is caused to present via the UI. For example, the message can be presented at the location of the UI element (e.g., on top of the UI element, above the UI element, or below the UI element). The message and a visual indicator associated with a degree of similarity can be caused to present to a manual tester at block 614. The visual indicator can be presented on the UI of the application under test or otherwise communicated visually to the manual tester via the compute device of the manual tester.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A test data comparison system comprising:
   a history engine to:
   gather test data used on a user interface, the test data to include location data;
   identify a plurality of test events related to the test data; and
   maintain a data store that stores a log of the test data based on the identified plurality of test events and element identifiers of a user, wherein the log of the test data includes a first data entered at a first location associated with a first element identifier;
   a comparison engine to:
   identify when a second data is manually entered at the first location associated with the first element identifier;
   compare the first data to the second data;
   determine a degree of diversity between the first data and the second data from the comparison of the first data and the second data; and
   determine the second data is diverse from the first data when the degree of diversity achieves a diversity level of a diversity rule, wherein the diversity rule specifies an amount of data to be compared, a class of data to be compared, and the diversity level of the diversity rule; and
   a suggestion engine to:
   cause a message to be generated based on the comparison of the first data to the second data; and
   cause the message to be presented on the user interface.

2. The system of claim 1, wherein the comparison engine is to:
   identify a characteristic of the second data;
   select the diversity rule based on the identified characteristic of the second data;
   identify a relationship between the first data and the second data based on an analysis of the identified characteristic of the second data; and
   determine whether the comparison of the first data to the second data achieves the diversity level of the diversity rule based on the identified relationship between the first data and the second data.

3. The system of claim 1, wherein the history engine is to:
   conglomerate a plurality of data entered at the first location associated with the first element identifier from a plurality of sources, the test data including the plurality of data entered at the first location associated with the first element identifier; and
   correlate a subset of the identified plurality of test events to the first element identifier, the first element identifier to represent a first user interface element at the first location associated with the first element identifier.

4. The system of claim 1, wherein the suggestion engine is to:
   select an example template based on the diversity rule; and
   generate a diverse data example from the example template.

5. The system of claim 1, wherein the suggestion engine is to:
   select a subset of the log of the test data to display based on at least one of a time scope and a degree of similarity of the second data to the subset of the log of the test data; and
   cause a visual indication of a portion of the log of the test data entered at the first location associated with the first element identifier based on a set of criteria including the time scope and a diversity category of a characteristic of the diversity rule.

6. The system of claim 1, wherein the comparison engine is to:
   determine a plurality of relationships between the first data and the second data, wherein the plurality of relationships include whether the comparison of the first data to the second data improves data diversity and whether the first data and the second data are not related; and
   determine the second data is diverse from the first data based on the plurality of relationships.

7. A non-transitory computer-readable storage medium comprising a set of instructions executable by a processor resource to:
   gather a set of data used to test a user interface ("UI") element at a first location of the UI;
   identify a plurality of test events related to the set of data;
   store a log of test data associated with the set of data and the plurality of test events;
   identify a characteristic of the set of data;
   select a diversity rule from a plurality of diversity rules based on the identified characteristic of the set of data, wherein the selected diversity rule specifies an amount of data to be compared, a class of data to be compared, and a diversity level;
   compare the set of data to a condition of the selected diversity rule based on a history of data entered at the first location;

determine, based on the comparison, a degree of diversity between the set of data and the history of data entered at the first location; and generate a message to be presented to a user when the set of data satisfies the diversity level of the selected diversity rule.

8. The medium of claim 7, wherein the set of instructions are further executable by the processor resource to:

track the history of data entered at the first location from a plurality of data sources, a first data source of the plurality of data sources to be input from a manual tester;

associate the history of data entered at the first location with the UI element based on a plurality of events associated with an identifier of the UI element; and store the history of data entered at the first location in a data store coupled to the processor resource.

9. The medium of claim 8, wherein the UI element is a text field, the set of data is text, and the set of instructions are further executable by a processor resource to:

recognize the text being entered at the text field;

identify a subset of the history of data entered at the first location based on similarity of the subset of the history of data entered at the first location to the text; and cause the message to include the subset of the history of data entered at the first location and an example of diverse data based on the selected diversity rule.

10. The medium of claim 7, wherein the set of instructions are executable by the processor resource to:

cause the message to display on a user interface at the first location; and cause an indication of the degree of diversity between the set of data and the history of data entered at the first location.

11. The medium of claim 7, wherein the selected diversity rule is selected based on an informational classification of the identified characteristic of the set of data and the selected diversity rule is at least one of:

a data length rule to compare a length of the set of data to a length of the history of data entered at the first location;

a data type rule to compare a first data type of the set of data to a second data type of the history of data entered at the first location;

a language rule to compare a first language of the set of data to a second language of the history of data entered at the first location;

a security rule to compare the set of data against potential security problems;

a password rule to identify a strength of password field data if the UI element is a password field;

an illegal character rule to compare a first character of the set of data to a second character of the history of data entered at the first location;

an administrative rule to compare the set of data to a business-specific definition; and a time rule to compare the set of data against a time scope.

12. The medium of claim 7, wherein the set of instructions are further executable by the processor resource to:

determine a plurality of relationships between the set of data and the history of data entered at the first location, wherein the plurality of relationships include whether a comparison of the set of data and the history of data entered at the first location improves data diversity and whether the set of data and the history of data entered at the first location are not related; and determine the history of data entered at the first location is diverse from the set of data based on the plurality of relationships.

13. The medium of claim 7, wherein the set of instructions is further executable by the processor resource to:

select an example template based on the selected diversity rule; and generate a diverse data example from the example template.

14. A computer-implemented method of data diversity identification comprising:

recognizing inspection data to be tested on a user interface ("UI") element, a source of the inspection data being a manual tester;

identify a plurality of test events associated with the UI element;

assembling historical data based on the plurality of test events associated with the UI element, the historical data stored in a data store;

comparing the inspection data to a condition of a diversity rule, wherein the diversity rule specifies an amount of data to be compared, a class of data to be compared, and a diversity level;

determining a similarity of the inspection data to the historical data based on the comparison; and generating a message regarding the similarity of the inspection data to the historical data when the condition of the diversity rule is achieved.

15. The computer-implemented method of claim 14, wherein determining the similarity of the inspection data to the historical data comprises:

identifying a characteristic of the inspection data, the identified characteristic of the inspection data being at least one of a textual characteristic and a semantic characteristic;

selecting the diversity rule from a rule database based on the identified characteristic of the inspection data; and determining the condition of the diversity rule is satisfied based on the identified characteristic of the inspection data applied to the historical data.

16. The computer-implemented method of claim 15, wherein the identified characteristic of the inspection data is an informational data type of the inspection data.

17. The computer-implemented method of claim 14, comprising:

aggregating the historical data from a plurality of sources; and correlating the historical data based on the plurality of test events associated with the UI element.

18. The computer-implemented method of claim 14, comprising:

defining a time scope of the historical data to compare to the inspection data;

causing the message to be presented to the manual tester via a user interface;

causing a visual indicator associated with a degree of similarity to be presented to the manual tester; and wherein the recognizing the inspection data occurs prior to completing a form, the UI element comprises a text field of the form, and the inspection data comprises potentially-entered text data of the text field of the form.

19. The computer-implemented method of claim 14, comprising:

determining a plurality of relationships between the inspection data and the historical data, wherein the plurality of relationships include whether a comparison of the inspection data and the historical data improves data diversity and whether the inspection data and the historical data are not related; and determining the historical data is diverse from the inspection data based on the plurality of relationships.

20. The computer-implemented method of claim 14, further comprising:

selecting an example template based on the diversity rule; and generating a diverse data example from the example template.

* * * * *